US008579686B2

(12) United States Patent
Abramoff et al.

(10) Patent No.: US 8,579,686 B2
(45) Date of Patent: Nov. 12, 2013

(54) GAMING EVENT PREDICTION SYSTEM AND METHOD

(75) Inventors: Franklin Abramoff, Beverly Hills, CA (US); Alan H. Gerson, Encino, CA (US)

(73) Assignee: The Predictor LLC, Burbank, CA (US)

( * ) Notice: Subject to any disclaimer, the term of this patent is extended or adjusted under 35 U.S.C. 154(b) by 0 days.

(21) Appl. No.: 13/452,535

(22) Filed: Apr. 20, 2012

(65) Prior Publication Data

US 2012/0270618 A1 Oct. 25, 2012

Related U.S. Application Data

(60) Provisional application No. 61/478,030, filed on Apr. 21, 2011.

(51) Int. Cl.
*A63F 13/00* (2006.01)

(52) U.S. Cl.
USPC .................................................. 463/9; 463/42

(58) Field of Classification Search
USPC ........................................................ 463/9, 42
See application file for complete search history.

(56) References Cited

U.S. PATENT DOCUMENTS

| | | | | |
|---|---|---|---|---|
| 6,293,868 | B1 | 9/2001 | Bernard | |
| 7,334,796 | B2 | 2/2008 | Wittwer | |
| 7,351,149 | B1 * | 4/2008 | Simon et al. | 463/42 |
| 7,887,416 | B2 | 2/2011 | Katsume et al. | |
| 2006/0290061 | A1 * | 12/2006 | Wilhelms | 273/292 |
| 2009/0270155 | A1 * | 10/2009 | Glass et al. | 463/16 |
| 2010/0035672 | A1 * | 2/2010 | Root | 463/2 |
| 2010/0184503 | A1 * | 7/2010 | Sultan | 463/19 |
| 2012/0174145 | A1 * | 7/2012 | Frazier et al. | 725/14 |

* cited by examiner

*Primary Examiner* — James S McClellan
(74) *Attorney, Agent, or Firm* — Fulwider Patton LLP

(57) ABSTRACT

The system and method for operating an online gaming event prediction game involves obtaining answers from a plurality of players at a plurality of game playing consoles to a plurality of predictive questions relating to possible outcomes of a plurality of elements of one or more scheduled competitive events, assigning point values to the answers, determining cumulative point scores for each of the plurality of players, and awarding prizes to the plurality of players, via an online game server and a communication network.

10 Claims, 1 Drawing Sheet

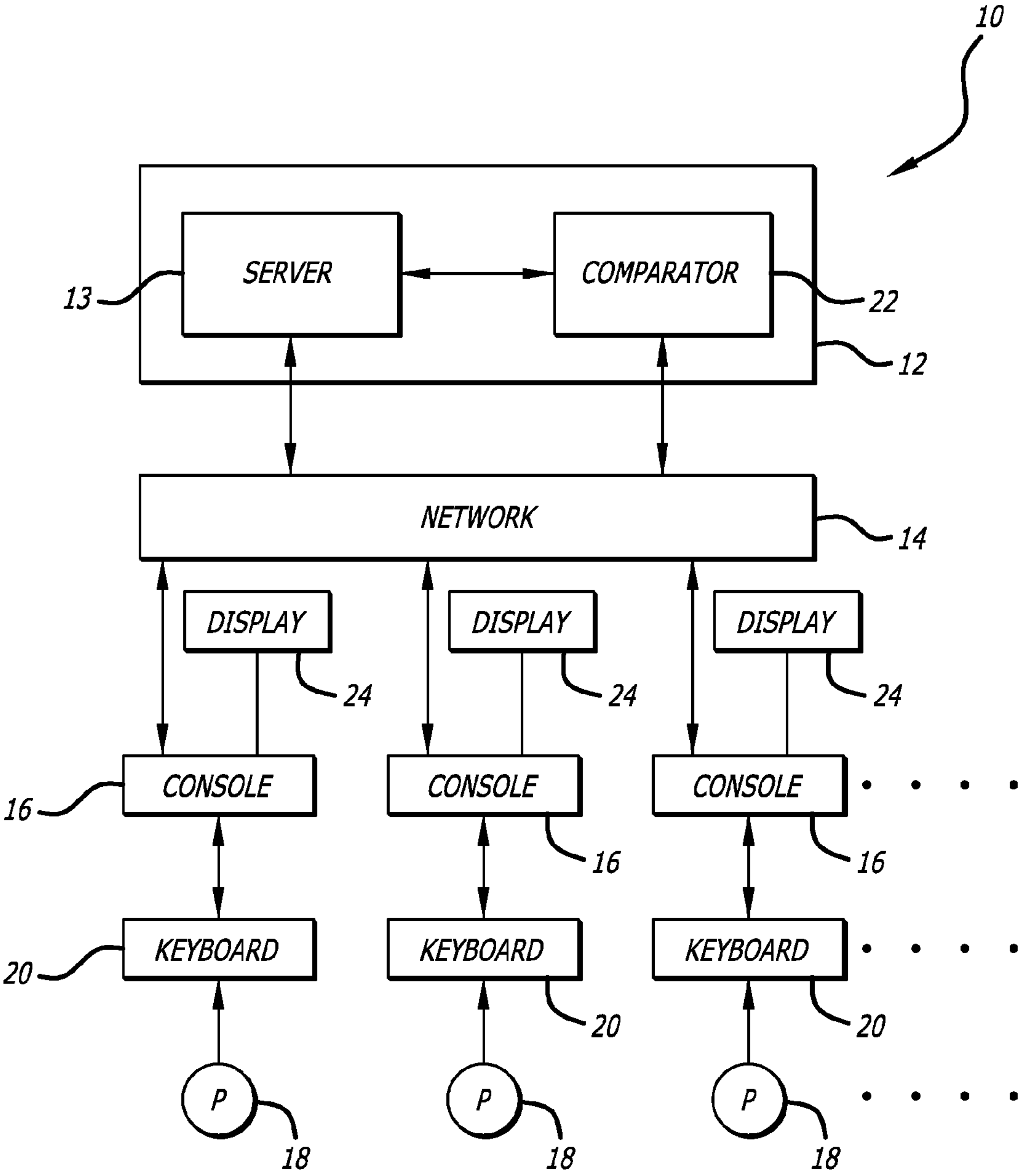
10
SERVER
COMPARATOR
13
22
12
NETWORK
14
DISPLAY
DISPLAY
DISPLAY
24
24
24
CONSOLE
CONSOLE
CONSOLE
16
16
16
KEYBOARD
KEYBOARD
KEYBOARD
20
20
20
P
P
P
18
18
18

GAMING EVENT PREDICTION SYSTEM AND METHOD

CROSS-REFERENCES TO RELATED APPLICATIONS

This application is based upon and claims priority from U.S. Provisional Application No. 61/478,030, filed Apr. 21, 2011, which is incorporated by reference herein.

BACKGROUND OF THE INVENTION

The present invention relates generally to a system and method for operating a operating a gaming event prediction game, and more particularly relates to a system and method for operating an online gaming event prediction game involving obtaining answers from a plurality of players at a plurality of game playing consoles to a plurality of predictive questions relating to possible outcomes of a plurality of elements of one or more scheduled competitive events, assigning point values to the answers, determining cumulative point scores for each of the plurality of players, and awarding prizes to the plurality of players, via an online game server and a communication network.

A system and method for playing a sporting event prediction and skill game in conjunction with participating in an event is known in which both predictions regarding an event are made and in which physical activity is also required. A menu of event elements is generated, with each element having possible outcomes associated with it, and a set of possible outcomes is generated to provide a prediction option set, from which players make a prediction regarding the elements of the event. A prediction is made by selecting one member of a set of prediction options. Points are awarded for each correct prediction and for achieving a selected objective in physical activities.

A stadium game for fans is also known in which players make advance predictions regarding an outcome expected to occur. The player records predictions in a form that can be scanned and transmitted to a remote analysis location, or input to a computer and analyzed by the computer. The predictions of each player are analyzed and compared to actual actions occurring during the event, and scores are given to each player based on the accuracy of the predictions.

It would be desirable to provide a system and method for operating a gaming event prediction game that will provide multiple players with a plurality of predictive questions relating to possible outcomes of various elements of a series of recurring scheduled contested events, with point values assigned to answers to the questions, and a website for players to view and answer the questions, and that can be accessed by a variety of game playing consoles. It also would be desirable to award prizes of different values over the course of the series of recurring scheduled contested events, as well as in champion rounds and grand champion sweepstakes. It also would be desirable to provide a system and method for operating a gaming event prediction game that also will provide social network and viral connections between players, as well as unique advertising, marketing and revenue opportunities. The present invention meets these and other needs.

SUMMARY OF THE INVENTION

Briefly and in general terms, the present invention provides for a system and method for operating an online gaming event prediction game involving obtaining answers from a plurality of players at a plurality of game playing consoles to a plurality of predictive questions relating to possible outcomes of a plurality of elements of one or more scheduled competitive events, assigning point values to the answers, determining cumulative point scores for each of the plurality of players, and awarding prizes to the plurality of players, via an online game server and a communication network.

The present invention accordingly provides for a system for operating a gaming event prediction game, including a remote controller for transmitting a plurality of event prediction questions relating to possible outcomes of a plurality of elements of at least one scheduled competitive event, and a plurality of game playing consoles for a plurality of players, respectively. Each of the plurality of game playing consoles has display and input/output capability, is configured to receive the plurality of event prediction questions, and includes an input device allowing a player to input a selection of a plurality of player answers to the plurality of event prediction questions. A remote comparison controller associated with the remote controller is operatively connected to the plurality of game playing consoles for the plurality of players, respectively, for making a comparison of the series of correct answers to the plurality of event prediction questions with the plurality of player answers to the plurality of event prediction questions, and for transmitting results of the comparison to the plurality of game playing consoles for the plurality of players, respectively, responsive to the selection of a plurality of player answers to the plurality of event prediction questions for each of the plurality of players, respectively. The system also awards points and prizes responsive to the selection of a plurality of player answers to the plurality of event prediction questions for each of the plurality of players, respectively, and a display is provided at each of the game playing consoles for displaying the points, awards, prizes based upon the comparison of the series of correct answers to the plurality of event prediction questions with the series of player answers to the plurality of event prediction questions selected by the player.

The present invention also provides for a method for operating a gaming event prediction game, including preparation of a plurality of predictive questions relating to possible outcomes of a plurality of elements of at least one scheduled competitive event for each scheduled contested event in a series of recurring scheduled contested events, assigning an initial point value of answers to each of the plurality of predictive questions, posting the plurality of predictive questions on a website for a plurality of players, and receiving a plurality of answers to the plurality of predictive questions for each of the plurality of players, respectively. The plurality of event prediction questions are transmitted to a plurality of game playing consoles for each of the plurality of players, respectively, where they are received and displayed, and each player's selection of a series of player answers to the plurality of event prediction questions is transmitted to the plurality of game playing consoles for each of the plurality of players, respectively.

Each player's selection of a series of player answers to the plurality of event prediction questions is transmitted from the plurality of game playing consoles for each of the plurality of players, respectively, to a remote comparison controller, which makes a comparison of the series of correct answers to the plurality of event prediction questions with the series of player answers to the plurality of event prediction questions selected by each of the plurality of players on the plurality of game playing consoles, respectively, to determine whether the plurality of answers to the plurality of predictive questions are correct or incorrect for each of the plurality of players, respectively. A cumulative point score is determined as the sum of point values of correct answers for each of the plurality of players, respectively. The players are awarded points for correctly predicting certain future outcomes contained in the questions, the results of the comparison are made available for transmission to the plurality of game playing consoles for each of the plurality of players, respectively, responsive to the selection of a series of player answers to the plurality of event prediction questions, and the points and prizes are displayed on the plurality of game playing consoles for each of the plurality of players, respectively, responsive to the selection of a series of player answers to the plurality of event prediction questions.

In a presently preferred aspect, the gaming event prediction game will be operated on a 52 week a year format. Fifty two (52) weekly question rounds and thirteen four (4) week champion rounds will award prizes, including bonus entries into the annual grand prize sweepstakes drawing, based on points awarded to registered players every week, depending on their success during each weekly question round in predicting the correct outcomes, based on the relative performances of teams and competitors, in future sports events and competitions which will take place that weekend. Interesting and compelling "predictive" questions will be proposed each week by the editorial staff relating to a cross-section of immediately upcoming sports events.

Points earned in weekly question rounds will not only count toward eligibility for prizing in that weekly question round, weekly points will roll up every four weeks into one of the 13 separate four week "champion rounds" where additional prizes will be available to the cumulative top scores in the four included weekly question rounds that make up each champion round. Players will accumulate points during each of the four weekly question rounds and cumulatively in each of the 13 champion rounds, based on their responses to twelve out of twenty weekly questions prepared for the game.

Prizes will be awarded for the top 50 point totals, including ties, in each of the 52 weekly question rounds and to the top 100 point totals in each of the 13 champion rounds, subject to the official rules of the game competition, and tie breaking procedures outlined in those official rules.

In addition to the weekly and champion round competitions, on the game website registered players will also be offered a chance to win prizes in an annual grand prize sweepstakes drawing. Each registered user at the game website will earn one (1) entry in that grand prize sweepstakes with their valid registration, and will earn one (1) additional grand prize sweepstakes drawing entry for each week that they submit a valid entry during any of the 52 weekly question rounds. Users will register and participate in the game, online, for free, through the game website. No charges will be levied by the site for access either through the Internet or via mobile devices. Registered users may play the game without being charged any fee and participation in one or more of the weekly question rounds of the game is entirely voluntary.

The format assures that during each annual period there will be a large number of winners from the 52 weekly question rounds and the 13 champion round competitions, in addition to a predetermined number of grand prize sweepstakes winners.

The editorial staff of the game website will develop contextual questions providing "factoids" relating to the comparative outcomes that each of the 20 weekly questions presented will give players the opportunity to "predict." Weekly questions will relate to immediately upcoming sports events and competitions, will focus on sporting events of widespread interest and importance taking place primarily in the united states, but may also include international competitions deemed of particular interest to our audience. Most weekly question rounds will be intended to provide questions relating to a range of different sports events, but in any particular week, the questions may primarily be related to an event of overwhelming importance, such as the super bowl. Even a cursory review of weekly sports television schedules reveals not only the wide appeal of sports but the vast range of different live sporting events being conducted each week of the year.

Each player will be given the opportunity to select 12 questions to answer each week. Each weekly question round player must designate two (2) of the 12 questions they select as their weekly "power" questions. Each correct answer to any of the 12 questions submitted will each points in both the weekly question round and the current champion round competition. The two "power" questions are of great importance because they will be worth 3 times the point value of the other individual questions each week if answered correctly. If answered incorrectly, 3 times the weekly point value of that incorrect "power" question will be deducted from their cumulative score for that week. There is no penalty for missing one of the 10 other questions, but of course no points are ever awarded for an incorrect prediction. Registered players are free to select any 12 of the 20 "outcome" questions posed, in the exercise of their own judgment as to their confidence and comfort level in making a correct prediction.

The more correct answers provided the higher the potential score available. This is especially true of the power questions which is intended to create greater interest, to be valuable in breaking ties and to create increased focus on which questions the player feels present the best opportunity for them to select the most probable outcomes. The entry form will include specific instructions that remind players that a valid entry must designate two power questions. At the time that players submit their twelve questions they will also be asked to provide an answer to three open ended tie breaker questions. The answers to these questions will be used solely to break ties among scores otherwise tied for the highest point total in each weekly question round. These tie breaker questions will not earn any points or play any role in the competition unless there are multiple weekly question round submissions with the highest point total that week. Each registered player who posts a weekly question round selection will have the opportunity to earn points in that weekly question round and, simultaneously, in the then current champion round competition based on correct answers submitted. Each weekly question round submission will also earn an entry into the annual grand prize sweepstakes drawing. There also may be an alternate method of entry for registered users of the site who do not submit weekly questions, and who wish to obtain a grand prize sweepstakes entry for that week.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

The FIGURE is a schematic diagram illustrating the system for operating a gaming event prediction game according to the present invention.

DETAILED DESCRIPTION OF THE PREFERRED EMBODIMENTS

Referring to the drawings, which are provided by way of example, and not by way of limitation, the present invention provides for a system and method for operating a gaming event prediction game 10. The system for operating the gaming event prediction game includes a remote controller 12, such as a computer server 13, for example, for transmitting a plurality of event prediction questions relating to possible outcomes of a plurality of elements of at least one scheduled competitive event via a network 14, such as a local network, wireless network or the Internet, for example. A plurality of game playing consoles 16, such as personal computers, mobile phones and wireless devices, including existing game console platforms, interactive television systems, "apps" on smart phones and tablets, personal digital assistants, or dedicated terminals or kiosks, for example, are provided for a plurality of players (P) 18, respectively. Each of the plurality of game playing consoles preferably has display and input/output capability and is configured to receive and display a plurality of event prediction questions. Each of the plurality of game playing consoles also includes an input device 20, such as a keyboard, touch screen or touchpad, for example, for allowing a player to input a selection of a plurality of player answers to the plurality of event prediction questions. A remote comparison controller or comparator 22, such as the remote server itself or another server associated with the remote controller, for example, is operatively connected to the plurality of game playing consoles for the plurality of players, respectively, for receiving the plurality of player answers to the plurality of event prediction questions, making a comparison of the series of correct answers to the plurality of event prediction questions with the plurality of player answers to the plurality of event prediction questions, and transmitting results of the comparison to the plurality of game playing consoles for the plurality of players, respectively, responsive to the selection of a plurality of player answers to the plurality of event prediction questions for each of the plurality of players, respectively. The system also awards points and prizes via the remote server itself or another server associated with the remote controller, for example, responsive to the selection of a plurality of player answers to the plurality of event prediction questions for each of the plurality of players, respectively. The game playing consoles preferably include a display 24 for displaying the points, awards, prizes based upon the comparison of the series of correct answers to the plurality of event prediction questions with the series of player answers to the plurality of event prediction questions selected by the player by the remote comparison controller.

In the method of the invention for operating a gaming event prediction game, a plurality of predictive questions relating to possible outcomes of a plurality of elements of at least one scheduled competitive event are prepared. In a presently preferred aspect, 20 predictive questions are prepared by a game administrator, game administrator team or editorial staff for each scheduled contested event in a plurality of recurring scheduled contested events, such as within a predetermined contest season of 52 separate weekly question rounds, and 13 four week champion rounds, for example. Typically, the format of the all of the questions will be multiple choice, although the questions may also be true-false, or call for a number to be input by a player, for example. In a presently preferred aspect, there will be a choice between outcome A or outcome B, plus a third outcome, outcome C, which is intended to cover the situation where there is the potential of a tie between choice A and choice B as well as to cover the situation where, for some reason, the scheduled competition does not occur or does not become official, and there is no clear outcome available. Any question for which an official outcome is not available for any reason whatsoever, will automatically have a correct prediction choice of "C". An initial point value is assigned for each of the plurality of predictive questions, and the plurality of predictive questions are typically posted on a website accessible to a plurality of players. A series of answers to the plurality of predictive questions, such as any 12 of the 20 questions posted, for example, are uploaded to the website for each of the plurality of players, respectively. Each player is also preferably required to designate two of the plurality of predictive questions as power questions, and an increased point value of answers that is a multiple of the initial point value, such as a multiple of three, for example, is assigned to each of the plurality of predictive questions indicated as weekly power questions. The plurality of event prediction questions are transmitted to a plurality of game playing consoles for each of the plurality of players, respectively, and the event prediction questions are received and displayed at the plurality of game playing consoles for each of the plurality of players, respectively. Each player's selection of a series of player answers to the plurality of event prediction questions is input to the plurality of game playing consoles for each of the plurality of players, respectively, and each player's selection of a series of player answers to the plurality of event prediction questions is transmitted from the plurality of game playing consoles for each of the plurality of players, respectively. Each of the player's selection of a series of player answers to the plurality of event prediction questions is received at a remote comparison controller for each of the plurality of players, respectively, and the remote comparison controller makes a comparison of the series of correct answers to the plurality of event prediction questions with the series of player answers to the plurality of event prediction questions selected by each of the plurality of players on the plurality of game playing consoles, respectively, to determine whether the plurality of answers to the plurality of predictive questions are correct or incorrect for each of the plurality of players, respectively.

The remote comparison controller determines a cumulative point score as the sum of point values of correct answers for each of the plurality of players, respectively. The initial point value of correct answers to questions indicated as power questions are summed, typically at an increased point value, such as 3 times the initial point value, for each power question answered correctly, and the increased point value is subtracted for each power question answered incorrectly.

Points are awarded for correctly predicting certain future outcomes contained in the prepared questions. In a presently preferred aspect, each weekly question round is a separate prizing competition, in which points earned during that week will determine placement and eligibility for the pre-determined prizes for the top 50 point totals, including ties. Each weekly question round also is part of a four week champion round competition. Cumulative points in the four included weekly question rounds will also be used to determine the prize awards in the champion round that encompasses that week. In another presently preferred aspect, the point value awarded for correct answers will change for each of the four weekly question rounds included in each champion round, based on where the week falls within the champion round competition. The two power questions will always have three times the value of the weekly point value. In week one of each of the weekly question rounds in each champion round, correct answers will be worth 100 points. In each week one of a champion round the power questions will be worth plus or minus 300 points each. In weeks two to four of each champion round the points awarded for a correct answer will rise by an additional 100 points from the previous week. Therefore a correct answer in week two of each champion round will be awarded 200 points; in week three 300 points and in week four 400 points. Points earned in weekly question rounds will determine contestants for 13 separate four week champion rounds, and players will accumulate points during each of the four weekly question rounds in each champion round, which will determine the players who will be eligible for prizes in the champion round pool of prizes. Weekly questions will be posted on the website each Tuesday at 10 AM ET. Registered players have until 3:01 AM ET Friday to submit their responses. Events which are the subject of the questions will occur on Friday, Saturday or Sunday of the week where the questions are posed. A countdown clock will be included on each players personal homepage to indicate the time left to submit their weekly question round choices. Points in the weekly question round competition will be awarded based solely on the basis of correct responses to the weekly question round entries submitted. Prizes will be awarded to the top 50 scores, including ties in each weekly question round. Prizes for the top 50 scores in each weekly question round, by place of finish, will be determined in advance. In addition, each registered player who submits a weekly question round entry will receive one (1) entry into the grand prize sweepstakes drawing regardless of the number of points scored. An alternative method of entry for a sweepstakes entry may be put into place, whereby registered players who do not submit a weekly question round entry can obtain one (1) entry in the sweepstakes drawing, through an email request, which must be made during the same time frame as is established for submission of weekly question round entries.

There will be no tie-breaker with respect to the weekly question rounds except in case of a tie for the top score of the week. In order to break potential “ties” for the highest score of the week, the editorial staff will also post three (3) open ended “tie breaker” questions each week along with the twenty weekly questions. If more than one player earns the top score of the week, then the answers to the three tie breaker questions will be consulted to break the tie, in the priority order they are presented on the site. (First tie breaker, second tie breaker and third tie breaker.) The tie breaker questions will not follow the same format as the weekly questions. They will require players to enter their “prediction” relating to a future sporting event or series of events, in an open ended fashion. For example: in a particular week, the three tie breaker questions might be presented as follows:

First tie breaker: In the final game of the NCAA Mens Basketball Championship tournament, what will the total number of points scored by both teams be: (with a space provided for the player to submit their prediction.)

Second tie breaker: In the three game weekend series between Boston and New York, to be played at Yankee stadium this coming Friday, Saturday and Sunday, what will the total announced paid attendance be for all three games (space provided to submit prediction)

Third tie breaker question: How many total goals will be scored in the seven scheduled NHL games to be played this coming Sunday: (space provided for prediction)

The tie breaker questions will be consulted in the order presented and scored on the basis of the response which is closest to predicting the actual number called for in the question, whether higher or lower, until the cumulative responses closest to the actual results indicate an overall winner who will receive the predetermined first prize award. The remaining players originally tied for first place will be placed in a tie for second place. In the unlikely event that after the three tie breaker questions there are still players tied for first place, duplicate prizes will be awarded and each such player will receive the pre-determined first prize award.

After the completion of the tie breaker process for first place, all other players who also submitted the top score in points that week will be considered to be tied for second, and all such tied players will share the pre-established prizes for the places that their gross scores, would have placed them until at least 50 players have qualified for weekly question round prizes. For example, if there are ten players originally tied with the highest gross score, the player who is selected by reference to the tie breaker questions as described above will receive the first place prize award. The other nine players with the same score will be placed in a tie for second place, and each will share the pre-established prizes for 2nd place through 10th place. If there were one player who had submitted the 2nd highest gross score in that week, that player would receive the prize for 3rd place. If there were 41 players tied with the third highest gross score, before the tie breaker, they would all share the pre-established prizing for 11th place through 50th place, even though this would result (per this example) in more than 50 players being awarded prizes. At the point where 50 players or more have been awarded prizes as a result of ties in any weekly question round, there will be no other prizes awarded. (for example: if in any week, 55 players are tied for the highest gross score in that week, the player selected by virtue of the tie breaker process would be awarded first place and the first place prize, and the other 54 players would share the cumulative pre-established prizing for 2nd through 50th place equally among them. No other players receive any prizes. However, the official rules will provide that in no event will any player who is entitled to receive a prize for having submitted a weekly question round entry which was among the top 50 highest scores posted, who as a result of ties, must share prizes with other players, receive less than the pre-established prize for 50th place. Therefore even should substantially more than 50 players earn points which puts them among the 50 top gross scorers, the game website will supplement the prize awards to ensure that no individual player with a top 50 gross point score will receive a prize below the prize level established for the 50th place in the weekly question round competition.

Prizes in the weekly question round rounds may consist of cash, merchandise prizes or predictor credits. All available prizes for each weekly question round will be announced before the beginning of each weekly question round. Cumulative points earned during the four included weekly question rounds will count toward determining the top 100 scores, including ties, which will establish the prize winners in the then current champion round. Sponsorships of the weekly question rounds will be offered to advertisers on the game website on a sponsorship basis and such sponsors will receive significant brand identification in connection with the play of the weekly question rounds. Proceeds from such sponsorships will be used to offset prize costs for each weekly question round.

Each of the champion rounds will have a separate prize pool to be awarded at the end of each of the 13 champion rounds. The 100 players (including ties) with the highest cumulative point totals earned in the four weekly question rounds which comprise each champion round will be awarded champion round prizes, based solely on cumulative points earned during the four included weekly question rounds.

Points earned in the four weekly competitions which comprise a champions round will not carry over to the next champion round. Each annual predictor competition will consist of 13 distinct four (4) week champion rounds. Players will start even with the same chance to win one of the champion round prizes at the beginning of each champion round competition.

Although the game will award prizes to the top 100 cumulative scores in the four included weekly question rounds, only one first place prize award will be made. In order to break any potential ties in the champion round for first place only, there will be three (3) special tie breaking questions posed only to those players who have accumulated the highest number of total points within that champion round. For example, if there are 12 players who have scored a perfect score in each of the four included weekly question rounds, those players would all be in essence, tied for first place in the champion round. Only those 12 players would be required to enter into the tie-breaker, to determine the winner of the first place prize award in that champion round. If an otherwise tied player does not participate in that tie-breaker, they will automatically be placed in a tie for second place. A link to the tie breaker will be sent only to those "tied" players, through their personal home page, on the Monday following the end of the champion round, by 3 PM Eastern Time, should a tie exist for first place. Players will have eighteen (18) hours to complete their submissions to the tie breaker questions, or not later than 10 am ET on Tuesday. The tie breaker questions will follow a different format than the standard predictor questions in order to maximize the likelihood of breaking the tie. Questions will all relate to a sport event or contest which will occur on the immediately following Tuesday or Wednesday (after the time to submit the tie breaker questions has expired.) The questions may be multipart questions with a multiple choice or an open ended answer format similar to the tie breaker questions outlined above with respect to the weekly question rounds. Each question will be worth 100 points, and each part of each question must be answered correctly to get full points for the question. However, each section of each question may be worth a different point value. If all players miss one or more parts of a tie breaking question, they will score partial points only. The points scored in the tie breaker, will be used only to break potential ties for first place, and will not be used for any other purpose.

In the event that more than one of the originally tied players with the highest cumulative point totals in the champion round answers all parts of all three questions correctly, or in the event that there are still ties based on the partial points earned, then multiple awards of first place in the standings and first place prizes will be made, and each player, still tied will be declared tied for first place and receive the pre-established first place prize. All other previously tied players who participated in the tie breaker will be placed in a tie for second place.

No prizes or standings in the champion round will become official until after the tie breaking procedure has been completed and final standings determined.

The game will, in addition to the champion round prize pools, award a separate grand champion sweepstakes prize or prizes to one of the registered players in the annual game competition. Points earned in the weekly question rounds will not count directly in determining the number of sweepstakes entries or determining the sweepstakes prize winner(s), but making a weekly question round submission and receiving an entry into the grand prize sweepstakes drawing for that action will improve the odds of being randomly selected in the grand prize sweepstakes drawing. Chances of winning are dependent upon the total numbers of entries in the drawing. Other opportunities to get additional entries may be created to encourage specific social network related activities on the game website or to encourage specific interactions with sponsor messages. Every eligible person registering for the game website will get one entry in the grand prize sweepstakes drawing for joining the site. As discussed above, entries will also be made available in certain circumstances through an email request as part of an alternative method of entry mechanism.

Multiday Special Event Competitions

In order to take advantage of the special interest and media attention in some special sporting events such as the masters golf tournament or the NCCA Men's Basketball Tournament or the MLB World Series, it is our intention to create special and additional game competitions built specifically around those multi-day events. Using the typical game question format, (questions about events or outcomes within an event that has not yet occurred) we will create a series of questions about these special events and publish them to our users at least a week before the event begins. These additional competition opportunities will only be available to players who have registered on the game website. There will be a separate prize pool and separate points awarded during these "special" or "tournament" related competitions, and each will be sponsored by one or more brand advertisers, who will co-promote and co-sponsor these special competitions and provide the separate pool of prizes.

Special official rules will be created and published for these special events and any points earned or accumulated as part of those special competitions will not count toward any of the regular competitions. These special competitions to the extent that they can be created far in advance of the actual events, may include bracket games, or fantasy league games or other formats to be developed. Questions about these events may also be included among the 20 questions offered in the concurrent regular weekly question round.

The gaming event prediction game will launch with a sport theme, however, it is contemplated that different themed versions of the gaming event prediction game, such as entertainment or politics among other possible themes can be simultaneously operated on the same basic format. For the purposes of this disclosure, only the sports theme example is used.

Operation of the Game

Each annual gaming event prediction game period will begin on the Monday immediately following that year's Super Bowl game, and will culminate on the subsequent year's Super Bowl Sunday. The format assumes that during each annual game period there will be a large number of champion round winners. In addition, there will be a predetermined number of grand champion sweepstakes winners. Further, we will offer at least 365 daily prizes through "instant win" awards supplied by brand advertisers. Everyone who registers and submits weekly entries will have an opportunity to win one or more of the thousands of potential prizes that can be awarded during the course of the year-long gaming event prediction game competition. No matter what their current or cumulative point standings, every registered player can have a chance to win valuable prizes by their participation in the weekly competitions or by visiting the gaming event prediction game website every day of the year.

The editorial staff of the prediction game will develop predictive statements based on then current sporting events taking place primarily in the United States, but may also include International competitions deemed of interest to our audience. For example, every week, on Tuesday morning at 10 AM Eastern time, 20 predictive questions will be posted on the prediction game website, relating to sporting events which will take place during the upcoming weekend (Friday, Saturday and Sunday). Each week players can choose to answer any twelve (12) of the 20 questions posted, and respond through a submission form which will be available to them through their registered player home page. All responses to the questions must be posted on the site not later than Friday at 3:01 AM EST. In addition, each player must select two (2) of the 12 questions they choose, which they will designate as their weekly "power" questions. These two "power" questions will be worth 3 times the point value of the other individual questions each week if answered correctly. If answered incorrectly, three times the weekly point value of that incorrect "power" question will be deducted from their cumulative score for that week. There is no penalty for missing one of the 10 other questions, but of course no points are ever awarded for an incorrect prediction.

Each registered player who posts selections will be automatically entered in the then current champion round competition. Each weekly entry will automatically earn an additional entry into the grand champion sweepstakes. If a perfect score of 12 correct predictions is achieved in any week by a registered entrant, that perfect score may also earn one (1) bonus entry into the grand champion sweepstakes.

Weekly Question Rounds, and Question and Answer Structure

Each week, registered players will have an opportunity to submit their "predictions" relating to upcoming bona fide sports events occurring on Friday, Saturday or Sunday of that week. The gaming event prediction game editorial staff will present 20 separate potential "outcomes" in the form of a question, each week. These questions will ask the player to predict an outcome relating to an element of the competition that is the subject of the question. These outcomes will not relate to who wins or loses the bona fide sports competitions, but rather will focus on individual or team statistics or performances over the course of the competition to which the question relates. These questions will concentrate on interesting "game within the game" elements relating to individual or team or comparative performances. These outcomes will always be verifiable by official statistics issued by the governing body for the sport event in question.

Each week, registered players must select 12 of the twenty questions and provide their prediction of the outcome. They are free to select any 12 of the 20 "outcome" questions posed, in the exercise of their own judgment as to their confidence in making a correct prediction. The more correct answers provided the higher the potential score available, so it is anticipated but not required that player will select 12 questions. No matter how many questions a registered player chooses, they will still have to designate two (2) of the questions they choose as their "power" questions. A correct answer to a "power" question will be worth three (3) times the value of the other ten (10) questions. However, an incorrect answer to a "power" question will result in a deduction of the triple value of that power question from the players overall point totals.

The format of the all of the questions will be multiple choice. There will be a choice between outcome A or outcome B, plus a third outcome, outcome C, which is intended to cover the situation where there is the potential of a tie between choice A and choice B as well as to cover the situation where, for some reason, the scheduled competition does not occur or does not become official, and there is no clear outcome available. Any question for which an official outcome is not available for any reason whatsoever, will automatically have a correct prediction choice of "C".

For example, in the scheduled NBA match between the Knicks and the Clippers, on Mar. 2, 2011 which team will successfully make the highest number of foul shots? A. Knicks, B. Clippers, C. Tie. (In this example, if number of made foul shots were the same by each team, or the game were cancelled, postponed or interrupted before it became official, C would be scored as the correct answer.)

Additional examples of gaming event prediction game questions using NFL football as an example:

1. Which quarterback in the Jets vs. Colts game will throw more completed passes? (choices: Jets, Colts, tie)

2. Will the total yards gained by both teams in the Chiefs vs. Ravens game exceed 750 yards? (choices: Yes, No, Exactly 750)

3. Which team in the Giants vs. Cowboy game will run the fewest offensive plays? (choices: Giants, Cowboys, tie)

4. Which team in the Pats vs. Dolphins game will have the most QB Sacs? (choices: Pats, Dolphins, tie)

5. Who will gain more total yards during the Vikings vs. Bears game (Combined Run, Pass, Return) Adrian Peterson or Devin Hester? (choices: Peterson, Hester, tie)

Events will be specifically identified by day and date and participants in each actual question in order to avoid any question as to the nature or meaning of the predictive choice required. All questions will be verified by reference to official statistics issued by the league or authority sanctioning or conducting the bona fide sports competition that is the subject of the question. Sporting events will extend to such major US college and professional sports leagues, along with such International competitions deemed of special interest or importance as selected by gaming event prediction game, in the sole discretion of the editorial staff, for which verifiable official statistics are readily available.

Instant Win Opportunities

Bonus "instant win" questions, sponsored by advertisers, may be presented for cash, credits or product based rewards in the discretion of the gaming event prediction game but would not count toward any of the official competition point totals. These questions may be survey questions, trivia questions or any other kind of response chosen by the advertiser. Registered players will be able to determine if they wish to answer any such instant win question or participate in any other incentivized engagement with a brand advertiser during their site visit in order to receive some sort of reward or incentive from that advertiser.

Example of Sponsor Incentivized Engagement

For your chance to win a free dinner for two, answer the following question: How many times a week do you go out for lunch/dinner at a restaurant? (0-1, 2 or 3, more than 3).

One or more daily instant winners will be selected by random drawing from among those responding and winners notified on their personal home page, along with instructions on how their reward or incentive will be delivered to them. Registered players will always be informed of the potential reward or incentive before they engage with the advertiser message. Other examples of sponsored engagements that will be offered to advertisers as part of media packages include sweepstakes, trivia contests and advergames. It is anticipated that the gaming event prediction game will develop and design such promotions and resell them to advertisers for placement on the prediction game website.

Event Information and Editorial Staff

Each week the prediction game editorial staff will post links to information made available to the public by sports teams, leagues or news organizations that may be used by registered players in making their question selection and posting their "predictions" each week. These links will be searchable by registered players from their personal home page. Players may use or ignore this information or supplement this information from whatever public or private sources they choose, or from their own research or recordkeeping. It is also contemplated that the home page of the website will contain a section featuring headlines and links related to news about the world of sports of interest to our users.

It is contemplated that the gaming event prediction game will facilitate subscriptions to information services relevant to the sporting events which are the theme of the gaming event prediction game, and may in some cases commission private source informational material which may be purchased by registered players for use in the play of the game.

Available Annual Major Sport Events/Competitions

There are a myriad of available sports competitions each year that will present an abundant subject matter for the gaming event prediction game questions. For example in the month of February, available sports competitions include NBA regular season games; NHL regular season games; NCAA men's basketball; NCAA women's basketball; NFL Super Bowl; Daytona 500; NBA All Star game; Budweiser Shootout (NASCAR); Gatorade Duel (NASCAR); Phoenix Race (NASCAR); and Daytona 500. In the month of March, available sports competitions include NBA regular season games; NHL regular season games; NCAA basketball March Madness begins; Major League Baseball Opening Day; MLB regular season games; Las Vegas (NASCAR); Bristol (NASCAR); and Fontana (NASCAR). In the month of April, available sports competitions include NCAA league tournament games; MLB regular season games; NHL regular season games; NCAA basketball Final Four begins; PGA Tour Events; the Masters Golf Tournament; NHL playoffs begin; NBA playoffs begin; Martinsville (NASCAR); Texas (NASCAR); Talladega (NASCAR); and Richmond (NASCAR). In the month of May, available sports competitions include MLB regular season games; NHL playoffs; Kentucky Derby; French Open Tennis; Preakness Stakes; Indianapolis 500; Darlington (NASCAR); Dover (NASCAR); All Star Race (NASCAR); and Charlotte (NASCAR). In the month of June, available sports competitions include MLB regular season games; NHL playoffs; Belmont Stakes; US Open (Golf); NCAA Baseball World Series; Wimbledon Tennis; NHL Stanley Cup finals; Kansas (NASCAR); Pocono (NASCAR); Michigan (NASCAR); and Sonoma (NASCAR). In the month of July, available sports competitions include PGA Golf; MLB regular season games; British Open (Golf); Daytona (NASCAR); Kentucky (NASCAR); Loudon (NASCAR); and Indianapolis (NASCAR). In the month of August, available sports competitions include MLB regular season games; Little League World Series; Pocono (NASCAR); Watkins Glen (NASCAR); Michigan (NASCAR); Bristol (NASCAR); and NFL Preseason football. In the month of September, available sports competitions include MLB regular season games; start of NFL Season; last day of MLB regular season; Atlanta (NASCAR); Richmond (NASCAR); Chicago (NASCAR); Loudon (NASCAR); NHL Preseason games; NBA preseason games; and NCAA men's college football. In the month of October, available sports competitions include NFL regular season games; NCAA men's college football; MLB playoffs begin; NHL season begins; MLB World Series begins; NBA basketball season begins; Dover (NASCAR); Kansas (NASCAR); Charlotte (NASCAR); Talladega (NASCAR); and Martinsville (NASCAR). In the month of November, available sports competitions include NFL regular season games; NHL regular season games; NBA regular season games; Melbourne Cup (Horse Racing); Breeders Cup (Horse Racing); ATP World Tours Finals (Tennis); Texas (NASCAR); Phoenix (NASCAR); and homestead (NASCAR). In the month of December, available sports competitions include NFL regular season games; NHL regular season games; NBA regular season games; and college football Bowl games. In the month of January, available sports competitions include NFL Playoff games; NHL regular season games; NBA regular season games; NCAA men's basketball; NCAA women's basketball; college football Bowl games; and Australian Open (tennis). Other available recurring events include X games (Summer and Winter); International Swimming events; International Ski events; International Soccer competitions; Tour De France; Major National and International Track and Field events; National college sports championship tournaments and events; NFL Draft; and NBA Draft.

Points Structure and System

Registered players will compete each week for "points" which will be awarded based on submitting correct answers to the predictive questions posed during each of the 52 weekly question rounds. Each correct answer to one of the twelve questions submitted for each weekly question round will earn the registered player "points." Each weekly question round is part of a single champion round competition. Cumulative points in the four included weekly question rounds will be used to determine the prize awards in that champion round. Points will not accumulate from champion round to champion round. At the beginning of the next champion round, point totals will be erased and every player will start fresh as far as points and standings for the new champion round.

Each weekly question round is a separate prizing competition, in which points earned during that week will determine placement and eligibility for the pre-determined prizes for the top 50 point totals, including ties. Each weekly question round also is part of a four week champion round competition. Cumulative points in the four included weekly question rounds will also be used to determine the prize awards in the champion round that encompasses that week. The point value awarded for correct answers will change for each of the four weekly question rounds included in each champion round, based on where the week falls within the champion round competition. The two power questions will always have three times the value of the weekly point value. In week one of each of the weekly question rounds in each champion round, correct answers will be worth 100 points. In each week one of a champion round the power questions will be worth plus or minus 300 points each. In weeks two to four of each champion round the points awarded for a correct answer will rise by an additional 100 points from the previous week. Therefore a correct answer in week two of each champion round will be awarded 200 points; in week three 300 points and in week four 400 points.

This point structure is intended to reward regular participation in each week of each round, and permit a registered player who misses a week to recapture points in the overall champion round standings in a subsequent week. It is also designed to keep all players in contention for prizes on an ongoing basis, since doing poorly in one champion round does not impact a player's ability to win a prize in the next four-week champion round cycle.

Individual player point totals and standings in the current champion round as well as the correct answers to the questions from the prior weekly question round will be posted on the prediction game website at 10 AM EST each Tuesday morning. All answers will be verified based on official statistics issued by the league or sanctioning body responsible for the Event upon which the question was based. There is no separate prize pool for the weekly question rounds, except every player who posts a perfect score (12 correct answers) will receive a bonus entry into the grand champion sweepstakes. Points earned during each weekly question round will count toward determining the prizewinners in the then current champion round. Prizes in the champion rounds may consist of cash, merchandise prizes or prediction game credits at the discretion of the gaming event prediction game. All available prizes for each champion round will be announced before the beginning of each champion round period.

Champion Round Competitions

In the champion round, the top 100 cumulative scores from the four included weekly question rounds, including ties, will be eligible for prizes. If there are no ties, the pre-established prizing for places 1-100 will be awarded according to their placement against all other scores. However, to the extent there are ties for any position, other than first place, (which will be broken according to the procedure set forth above,) players tied will share the prizes for all places within the ranking of scores from 2-100, taken up by the tied players. Therefore, in the example above, after the tie breaker, the other 11 previously tied players will be placed in a tie for 2nd place, and they will share equally among themselves, the pre-established prizes for places 2nd to 11th. The player who had the 2nd highest cumulative gross score would receive the prize for 12th place, since 11 other players did in fact score higher than that player did. If there are 100 players tied for the 3rd highest cumulative score, those 100 players will share equally among themselves the pre-established prizes for places 13th to 100. This would result in more than 100 players receiving prizes due to the fact that those players had posted the cumulative scores which were among the top 100 scores, including ties. However, the prizing would be limited to the pre-established total of champion round prizes, shared among, for the purposes of this example, the 112 players involved. However, the prize awards will be supplemented to ensure that no individual player with a top 100 gross point score in the champion round will receive a prize below the prize level established for the 100th place in the champion round, regardless of the number of ties. Prizes may consist of cash, merchandise, or predictor credits. Prizes available in each champion round, and their approximate retail value, will be announced before the beginning of each such round. Prizing for the top 100 places will be distributed as described above.

As discussed above, in order to help encourage site traffic and repeat visits to the Site that regular "instant win" awards, contributed by advertisers, will be offered to site visitors and or registered players. The number and nature of these awards may vary but we will commit to a minimum number during each day of each champion round. Winners will be chosen at random from among home page visitors and players completing their login. It is anticipated that this instant win program will be a revenue source in its own right, as well as a loyalty and traffic building device.

Further, the prediction game will offer advertisers on our site, the ability to place "incentivized" surveys on the site, as well as other "incentivized engagements" which can be targeted to registered players based on demographic information. This will represent an additional prize opportunity for our players as well as a revenue source for the gaming event prediction game. Other similar promotional devices, including sweepstakes offers and advergame opportunities will be offered as a content driven advertising opportunity at premium pricing to our advertisers. These prizes and awards will not be linked to the point system or dependent upon answering questions in the competitions correctly. However, under the structure we have proposed of 13 champion round competitions, as well as a grand champion sweepstakes and advertiser supported instant win and ad based engagements, the gaming event prediction game will be offering hundreds of prizes and prize opportunities a month to our players. Unless otherwise stated by management, points earned in the prediction game competition are valid only to qualify for periodic prizes offered in the champion round of the prediction game competition, as determined by the rules of the competition. Points have no monetary value or rate of exchange. Points earned during the weekly question rounds of each champion round competition, or earned in any tiebreaker, will expire at the end of each such champion round.

The prize structure of the champion round and the grand champion sweepstakes will be determined before the commencement of each competition or promotion. It is anticipated that the prize budgets will grow as registrations grow and advertising revenue increases. Nevertheless, the perceived value of the top prize and the other available prizes in the champion round will be set at a level calculated to entice interest and participation. The top prize in the Yearly grand champion sweepstakes is anticipated to be not less than $1,000,000, awarded over a period of time not to exceed 30 years, as an annuity payment.

Prize awards made through the prediction game competition structure typically will include products and services provided by sponsors who will get commercially valuable name and logo placement in connection with each champion round. For example, 13 champion round "sponsorships" will be offered to "name" sponsors who would also get name sponsor rights to the four included weekly question rounds. An overall name sponsorship will also be offered in connection with the annual grand champion sweepstakes. Sponsorship fees for these rights will underwrite the credits issued as prizes. These rights will be valued based on the registered memberships.

Champion Round Competitions Prize Structure

It is anticipated that the prize award structure for the weekly question rounds and the champion rounds will be similar, in that there will be prizes specified for first place, and from places 2 to 10. Thereafter, the prizes will be grouped by 11 to 25; 26 to 50 and for the champion round, 51 to 100. The top scores in each round will receive the highest value prize and the balance of the top ten will receive slightly decreasing prizes from 2-10. Scores between 11 and 25 will all receive the same prize, which will be a decrease from the prize award to number 10. Similarly scores between 26 and 50 will receive the same prize award, which will be less than the above 25 prize structure, and the last group in the champion round for places between 51 and 100 will receive the same prizing but further reduced from the prizing levels in the prior placement grouping. In addition to cash or merchandise prizes which may be established by the site and the sponsors, the game intends to use "predictor credits" extensively as prize awards.

The prize structure below is included for purposes of example only.

Example of Possible Weekly Question Round Prize Structure

First place: $7500 in cash and/or merchandise prizes and/or predictor credits.

2nd place: $6,000 or the equivalent in cash and/or merchandise or credits.

3rd place: $5000 or the equivalent in cash and/or merchandise or credits.

4th place: $4000 or the equivalent in cash and/or merchandise or credits.

5th place: $3000 credits or the equivalent in cash and/or merchandise or credits.

6th through 10th: $2500 or the equivalent in cash and/or merchandise or credits.

11th to 25th: $200 or the equivalent in cash and/or merchandise or credits.

26th to 50th: $1500 or the equivalent in cash and/or merchandise or credits.

Example of Potential Champion Round Prize Structure

First place: $30,000 in cash, merchandise prizes.

2nd place: $24,000 or the equivalent value in merchandise, cash and/or credits.

3rd place: $20,000 or the equivalent value in merchandise, cash and/or credits.

4th place: $18,000 or the equivalent value in merchandise, cash and/or credits.

5th place: $16000 credits or the equivalent value in merchandise, cash and/or credits.

6th to-10th: $12,500 or the equivalent in cash and/or merchandise or credits.

11th-25th: $7500 or the equivalent in cash and/or merchandise or credits.

25th to 50th: $5,000 or the equivalent in cash and/or merchandise or credits.

51-100 (including ties): $2500 or the equivalent in cash and/or merchandise or credits.

Grand Champion Sweepstakes:

A random drawing will be held to award the grand champion sweepstakes prize. Each registered player will have a minimum of one entry into the sweepstakes. Additional entries will be available to be earned based on participation in weekly question rounds or by other participation in gaming event prediction game site activities as may be announced during the year, as described above. First prize in the grand champion sweepstakes will be a minimum of $1,000,000, awarded as an annuity over 30 years. Additional winners of cash and or merchandise prizes may be established after discussion with the title sponsor. Total prizes in grand champion sweepstakes: $1,000,000 minimum, plus merchandise prizes that may be contributed to increase the number of winners in the grand champion sweepstakes.

The gaming event prediction game will require the name sponsors to contribute "credits" as part of their fee, and/or apply the sponsorship revenues against any of the "credits" awarded as prizes. Daily instant win opportunities "sponsored" and contributed by advertisers will both add to the amount and value of the total prizes available in the gaming event prediction game as well as create additional offsetting revenues to fund any credits given as prizes.

Site Design and Capabilities

The website of the gaming event prediction game will include a home page with a link to register as a new member and a link for existing members to log in using their user name and password. Once a new member is registered they will be returned to the home page to log in. All players must first register with the gaming event prediction game providing their name, address, cell phone number, date of birth, and valid email address. They may be offered an opportunity at registration to opt-in to receiving additional offers from the gaming event prediction game or its advertising clients. Registered players will also be required to select a unique player nickname and a password for login. However, site security will match player nickname to their valid email address. Only one player registration per valid email address will be accepted. However, players may register up to three (3) "nicknames" and play up to three simultaneous game entries, each week, if they so choose. scores and standings for all valid "nicknames" will be tracked through the registered users home page. The home page will have promotional graphics and copy for the gaming event prediction game which will make a strong call to action to promote registration as well as links to official rules, privacy policy and detailed prize descriptions. The home page will also have a central area that will present news headlines and blurbs relating to the world of sport. there will also be a home page banner ad that can be sold to advertisers.

Personal Home Pages

Upon login, registered members will be served their personal home page. This home page will contain standard elements, including rules, privacy policy and prize description links as well as a reserved section for advertising and/or incentivized engagements. Every player's home page will also provide:

1. A link to their current point totals for the current weekly competitions and the current champion round competition.

2. A link to their cumulative number of entries earned toward the $1,000,000 grand champion sweepstakes.

3. A link to their current credit bank showing their earned credits.

4. A link to the prediction game store.

5. A link to their friends list. The friends list page will allow them invite friends to the site, to check who among their friends in presently on the site, and to allow an instant message or invite to a chat room (where all current conversations among the friends on their list can be seen) so they can converse with friends.

6. This page will also display the 20 current weekly questions and the amount of time remaining to submit their selections. They can indicate which 11 they wish to predict, designating one (1) question as the power question, and submit those questions from this section of their home page. If they submit less than 11 they will be notified that they have more selections available. If they submit more than 11 they will be prompted to resubmit.

7. After they submit their weekly answers to the prediction game questions they selected, each player will be served a confirmation page confirming their entry has been accepted, with additional advertising or engagement opportunities.

8. Also displayed on their personal home page will be the top 25 current cumulative champion round point totals for the current champion round using the registered nickname of the players plus their current cumulative standing in that round.

9. The personal home page will also have links to the site home page, and to sponsor Information resources.

A prediction game store will be modeled on popular Affiliate point reward sites, and will be designed as an advertising media opportunity; a transactional catalogue and a shopping cart where vendors, who pay a commission on sale and/or a "slotting fee", can offer their goods and services for purchase by players, using prediction game credits as currency.

This will represent both a superior advertising opportunity and a unique transactional opportunity for advertisers and vendors. An interactive product page will be created which will provide information and specification on the product or services offered, as well as the opportunity to complete a purchase. Players may use a search function to browse the Store catalogue and click on any product for more information. If they complete a purchase then gaming event prediction game will earn a commission. If they do not then gaming event prediction game will nevertheless earn a "media fee" for having presented the product information. Certain featured products will pay a slotting fee for placement, plus the fees and commissions above.

There will be featured products and services, plus a way to search all products by category or vendor. There will be a featured banner ad placement on the home page of the store. Vendors will pay a placement fee for being a featured product or service, and clicking on the featured product will also earn the player a set number of credits, contributed by the vendor (and purchased from the gaming event prediction game).

Each product will have its own landing page with product graphic, specifications, and pricing, plus a link to purchase the product. When the player clicks purchase they are taken to a form page where they can fill out delivery information, and pay for the product with credits they have previously earned. the site will check their available credits via a login feature. If they do not have enough credits, they can purchase additional credits with their credit card. Once they pay, the credits will be deducted from their account, and they will receive a printable receipt with advertising messages from the vendor.

First time visitors to the site will be given ten (10) credits for visiting. They can earn additional credits by visiting various vendor product pages (credits contributed by vendor and purchased from the gaming event prediction game) to encourage purchase and redemption of products. Products will include merchandise and services with emphasis on downloadable products like music, e-books, games and DVDs. It will also feature electronic products and sports equipment, apparel and memorabilia. The gaming event prediction game also believes that a marketplace for "virtual goods" which players can purchase with credits can be created. These virtual goods can include an "avatar" or a symbol to be included with the player's nickname in instant messaging or chat room conversation, "badges" which recognize that they were a prizewinner in one or more competitions, and the like. While the gaming event prediction game will earn a commission on sales of vendor merchandise, the site itself will be the vendor of the virtual goods, which will have zero real costs to create, and will be acquired by payment of real dollars, or by redemption of credits.

Prediction Game Credits and The Prediction Game Store

An opportunity exists around creation of a virtual currency, or prediction game credits, which will be available to be awarded as prizes and as rewards or incentives for actions taken on the site. For example, prizewinners may be awarded credits for finishing in the top 100 of the champion round point totals, depending on their spot in the order of finish. Credits may also be "sold" to advertisers to use as rewards or incentives for player engagement with advertising messages, surveys, sweepstakes or branded advergames. Each credit will have a "value" to be determined by the company. Credits will have an approximate "cash value" to be set by the game store against the listed selling price of specific items made available to players for purchase within the game store. For example, a specific product may have a listed price of X dollars plus Y credits. Thus, players may use credits to reduce the stated price of merchandise goods and services up to a percentage acceptable to the vendor after negotiations with the game store on the total price. Typically, credits not redeemed for merchandise or services through the predictor site, will have a cash redemption value not to exceed one tenth of a cent, for example, when sold back to the predictor by players.

Players may also purchase credits from the predictor to complete an exchange for products or services in the game store, if they are short of credits in their account and wish to make a specific purchase. Players will pay a predetermined value in cash for credits purchased.

It is also contemplated that registered players, may, should they wish, be able to transfer credits from their personal account, to the accounts of other registered players who are on their "friends" list on the game website. This will enhance social interactions, encourage word of mouth promotion of the site and the game, and generally increase interest in site visits and game participation by encouraging private group leagues and competitions to be played on the site between friends.

Advertisers will be encouraged to buy credits from the game site to fund their reward and incentive based engagement strategies as described above. Sponsorship fees for name sponsorship of various competitions conducted on the game website will be calculated with a factor to include the expected prize levels to be given away to winners in the various the game website competitions. The use of credits, to the extend they are ultimately included in the prize awards, will reduce the out of pocket costs of the various prize budgets significantly, based on their minimal redemption values and the fact that a significant portion of credits in the system will have been purchased by advertisers and sponsors with real dollars.

For example: If we assume a "equivalent retail value" for a credit of 10 cents, then if an item in the store is listed as selling for $100, the player may choose to pay $50.00 plus 500 credits to obtain the product or service. At the time of the transaction, the game store will deduct available credits from the player account to complete the transaction. If they player has fewer than the required number of credits, they may purchase the credits from the game store for ten cents each.

It is anticipated that the game store will conduct transactions in two ways. It can create a link so that the vendor can complete the cash portion of the sale on their own site and through their own shopping cart. In this case, the game store will deduct its sales commission of 20% from the credits otherwise due to the vendor, and transmit the balance of the credits due (400) to a vendor account. The vendor will complete the sale on its site and through its shopping cart and arrange for shipment from its warehouse. The 100 credits representing its sales commission will revert to and be retained by the game website to use as prizes or for other purposes as it sees fit. If the purchase is completed on the vendor site entirely through a credit card, the vendor will remit 20% of the purchase price to the game website in cash following settlement of the card.

In the event the registered user wishes to purchase a "virtual product" for example a 'badge' or an avatar from the game store, they will pay for such a purchase entirely in credits, and the game website will be the vendor.

The value of the amount of credits which may be used to complete a discounted sale for any particular item in the game store will always be more than the anticipated fees and commission from the merchant for placement of their products in the store, guaranteeing a profit to the game store, as well as a reward and incentive to the registered members of the site to play in the competitions and interact with the sponsored messages and partake in social network opportunities to earn credits. The credits system as contemplated would require all credits to be purchased from the predictor for a predetermined equivalent cash value. It would be a goal of the game store for a significant percentage of the credits made available to registered users to be constantly recycled into the system through store transactions. The game website site will eventually be taking advantage of a growing "bank" of "prepaid" credits, which would be available to fund prize budgets, significantly reducing costs and greatly increasing overall site profitability.

It should be apparent that the prediction game could also involve charging a fee for forming prediction game teams/leagues and keeping scores, sponsored email alerts to registered users on opt-in basis, a Facebook page with viral widget (new technology ESG has available that can allow for viral distribution and entry capture through social networks), FLOG interactive calendar with game alerts/predictive stats can also provide sponsors with ability to send marketing messages directly to online calendar of players, charity tie ins with sponsors, as well as "mini" gaming event prediction game leagues built around individual teams, sports or conferences, such as Duke basketball, ACC men's basketball, SEC football, PAC TEN football, Michigan vs. Ohio State All Sports, PGA Golf, and the like.

It will be apparent from the foregoing that while particular forms of the invention have been illustrated and described, various modifications can be made without departing from the spirit and scope of the invention.

What is claimed is:

1. A method for operating a gaming event prediction game, comprising the steps of:

preparing a plurality of predictive questions relating to possible outcomes of a plurality of elements of at least one scheduled competitive event for each scheduled contested event in a series of recurring scheduled contested events;

transmitting the plurality of event prediction questions to a plurality of game playing consoles for each of the plurality of players, respectively;

receiving and displaying said event prediction questions at said plurality of game playing consoles for each of said plurality of players, respectively;

inputting each said player's selection of a series of player answers to said plurality of event prediction questions to said plurality of game playing consoles for each of said plurality of players, respectively;

transmitting each said player's selection of a series of player answers to said plurality of event prediction questions from said plurality of game playing consoles for each of said plurality of players, respectively;

receiving each said player's selection of a series of player answers to said plurality of event prediction questions at a remote comparison controller for each of said plurality of players, respectively, said remote comparison controller making a comparison of said series of correct answers to said plurality of event prediction questions with the series of player answers to said plurality of event prediction questions selected by each of said plurality of players on said plurality of game playing consoles, respectively, to determine whether the plurality of answers to said plurality of predictive questions are correct or incorrect for each of said plurality of players, respectively;

determining a cumulative point score as the sum of point values of correct answers for each of said plurality of players, respectively, wherein at least one of said plurality of predictive questions is designated as a power question, and assigning an increased point value of answers to each of said plurality of predictive questions designated as a power question that is a multiple of an initial point value, and wherein each player is given the opportunity to selected twelve questions to answer each week, and each player designates two of the twelve questions as power questions each week;

awarding said plurality of players points for correctly predicting certain future outcomes contained in said plurality of predictive questions;

making the results of the comparison available for transmission to the plurality of game playing consoles for each of the plurality of players, respectively, responsive to the selection of a series of player answers to the plurality of event prediction questions; and displaying the points and prizes on the plurality of game playing consoles for each of the plurality of players, respectively, responsive to the selection of a series of player answers to the plurality of event prediction questions.

2. The method of claim 1, wherein the format of said plurality of predictive questions is multiple choice.

3. The method of claim 2, wherein the format of said plurality of predictive questions provides a choice between a first, second and third outcomes, wherein the third outcome covers a situation in which there is the potential of a tie between the first and second outcomes, and covers a situation in which a scheduled competition does not occur or does not become official, such that no clear outcome is available.

4. The method of claim 3, wherein any question for which an official outcome is not available has as a correct prediction choice of the third outcome.

5. The method of claim 1, wherein said plurality of predictive questions comprises twenty questions.

6. A system for operating a gaming event prediction game, comprising:

a remote controller for transmitting a plurality of event prediction questions relating to possible outcomes of a plurality of elements of at least one scheduled competitive event;

a plurality of game playing consoles for a plurality of players, respectively, each of the plurality of game playing consoles being connected to said remote controller by a network, each of the plurality of game playing consoles having display and input/output capability, and each of the plurality of game playing consoles being configured to receive the plurality of event prediction questions, and each of the plurality of game playing consoles including an input device allowing a player to input a selection of a plurality of player answers to the plurality of event prediction questions;

a remote comparison controller associated with the remote controller, said remote comparison controller being operatively connected to the plurality of game playing consoles for the plurality of players, respectively, for making a comparison of the series of correct answers to the plurality of event prediction questions with the plurality of player answers to the plurality of event prediction questions, and for transmitting results of the comparison to the plurality of game playing consoles for the plurality of players, respectively, responsive to the selection of a plurality of player answers to the plurality of event prediction questions for each of the plurality of players, respectively, said remote comparison controller being configured to award points and prizes responsive to the selection of a plurality of player answers to the plurality of event prediction questions for each of the plurality of players, respectively, wherein at least one of said plurality of predictive questions is designated as a power question, and an increased point value of answers is assigned to each of said plurality of predictive questions designated as a power question that is a multiple of an initial point value, and wherein each player is given the opportunity to selected twelve questions to answer each week, and two of the twelve questions are designated as power questions by each player each week; and a display connected in communication with each of the game playing consoles for displaying the points, awards, and prizes based upon the comparison of the series of correct answers to the plurality of event prediction questions with the series of player answers to the plurality of event prediction questions selected by the player.

7. The system of claim 6, wherein the format of said plurality of predictive questions is multiple choice.

8. The system of claim 7, wherein the format of said plurality of predictive questions provides a choice between a first, second and third outcomes, wherein the third outcome covers a situation in which there is the potential of a tie between the first and second outcomes, and covers a situation in which a scheduled competition does not occur or does not become official, such that no clear outcome is available.

9. The system of claim 8, wherein any question for which an official outcome is not available has as a correct prediction choice of the third outcome.

10. The system of claim 6, wherein said plurality of predictive questions comprises twenty questions.

* * * * *